United States Patent [19]

Morishita

[11] 4,415,848

[45] Nov. 15, 1983

[54] ALTERNATING CURRENT POWER SOURCE APPARATUS FOR CAR

[75] Inventor: Mitsuharu Morishita, Himeji, Japan

[73] Assignee: Mitsubishi Denki Kabushiki Kaisha, Tokyo, Japan

[21] Appl. No.: 308,237

[22] Filed: Oct. 2, 1981

Related U.S. Application Data

[63] Continuation of Ser. No. 73,132, Sep. 6, 1979, abandoned.

[30] Foreign Application Priority Data

Sep. 15, 1978 [JP] Japan ................... 53-127508

[51] Int. Cl.³ .................. H02J 7/14; H02P 9/14; H02P 9/42
[52] U.S. Cl. ..................... 322/32; 322/89; 323/318
[58] Field of Search ............. 322/28, 32, 89, 90; 320/57, 59, 64, 68; 323/161

[56] References Cited

U.S. PATENT DOCUMENTS

| | | | |
|---|---|---|---|
| 3,274,480 | 9/1966 | Walker | 363/161 |
| 3,287,622 | 11/1966 | Eckenfelder et al. | 363/161 |
| 3,659,168 | 4/1972 | Salihi et al. | 363/161 X |
| 3,982,170 | 9/1976 | Gritter et al. | 322/32 X |
| 4,117,389 | 9/1978 | Hazumi et al. | 322/32 X |

*Primary Examiner*—R. J. Hickey
*Attorney, Agent, or Firm*—Oblon, Fisher, Spivak, McClelland & Maier

[57] ABSTRACT

An alternating current power source apparatus comprises an AC generator having a field coil which is driven by an engine; a first rectifier having one or more thyristors which rectify the AC output of the AC generator; a second rectifier having one or more thyristors which is connected in parallel to said first rectifier to give the output having a polarity reverse to the polarity of the output of said first rectifier; an AC driving load connected to said first and second rectifiers; a voltage control device for controlling the output voltage of said generator to a predetermined value by controlling a field current passing through said field coil; an oscillator for oscillating at a desired frequency; and a gate signal generating circuit which is controlled by the output of said oscillator so as to feed a turn-on signal alternately to said gate circuit of said first rectifier and said gate circuit of said second rectifier.

3 Claims, 1 Drawing Figure

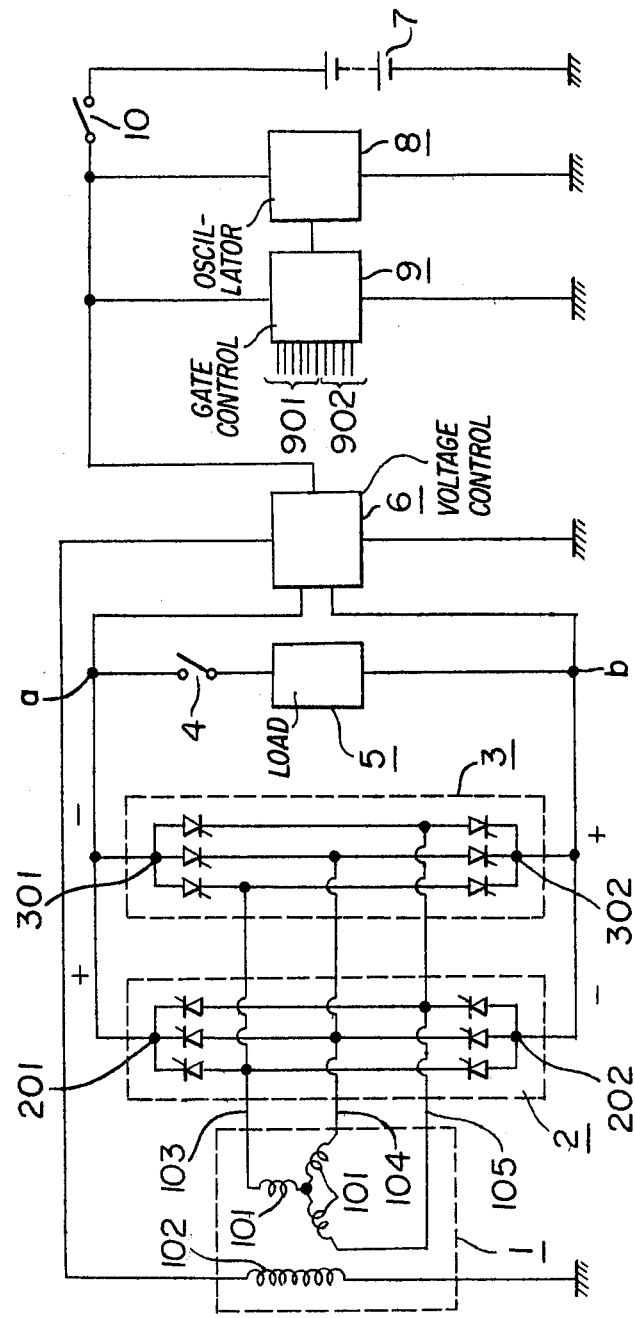

ALTERNATING CURRENT POWER SOURCE APPARATUS FOR CAR

This is a continuation of application Ser. No. 073,132, filed Sept. 6, 1979, now abandoned.

BACKGROUND OF THE INVENTION

1. Field of the Invention

The present invention relates to an alternating current power source apparatus which controls an AC output of an AC generator driven by an engine equipped in a car etc. to a desired voltage and a desired frequency.

2. Description of the Prior Arts

In the conventional apparatus, an AC generator driven by an internal combustion engine equipped in a car etc., usually outputs a relatively low voltage (such as 12 V, 24 V or 50 V) which is lower than a required alternating voltage (such as 100 V) and the output is rectified to the direct current so as to charge a battery in the car and the direct voltage is intermittently changed in a constant frequency (such as 50 or 60 Hz) so as to feed it as a primary input of a transformer whereby an alternating power source having a desired voltage (such as 100 V) and a desired frequency (such as 50 or 60 Hz) is formed in the secondary side.

However, in accordance with the conventional DC-AC converter system, the generator generates the alternating current and the alternating current is rectified to the direct current and the direct current is further converted to the alternating current by the chopper and the alternating current is further boosted by the transformer to obtain a desired voltage. This is the ineffective system.

Various devices such as the rectifier for converting the alternating current to the direct current and the chopper for converting the direct current to the alternating current and the transformer for boosting the voltage are needed in the conventional system. Accordingly, the apparatus is heavy and expensive and has a large size and low efficiency and low reliability. These are disadvantages which prevent the practical application in the car market.

SUMMARY OF THE INVENTION

It is an object of the present invention to provide an alternating current power source apparatus for a car which has not the abovementioned disadvantages.

The present invention is to provide an alternating current power source apparatus comprising an AC generator having a field coil which is driven by an engine; a first rectifier having one or more thyristors which rectify the AC output of the AC generator; a second rectifier having one or more thyristors which is connected in parallel to the first rectifier to give the output having a polarity reverse to the polarity of the output of the first rectifier; an AC driving load connected to the first and second rectifiers; a voltage control device for controlling the output voltage of the generator to a predetermined value by controlling a field current passing through the field coil; an oscillator for oscillating at a desired frequency; and a gate signal generating circuit which is controlled by the output of the oscillator so as to feed a turn-on signal alternately to the gate circuit of the first rectifier and the gate circuit of the second rectifier.

BRIEF DESCRIPTION OF THE DRAWINGS

FIG. 1 is a circuit diagram of one embodiment of the alternating current power source apparatus.

DETAILED DESCRIPTION OF THE PREFERRED EMBODIMENT

Referring to the drawing, one embodiment of the alternating current power source apparatus of the present invention will be illustrated.

In the drawing, the reference numeral (1) designates a three phase AC generator driven by an internal combustion engine (not shown) in a car etc.; and the AC generator comprises an armature winding (101) in a star connection and a field coil (102) to generate an alternating current voltage of about 100 V and numerals (103), (104) and (105) respectively three phase alternating current output terminals of the armature coil (101) connected in three phase star connection. The reference numeral (2) designates a first full wave rectifier having thyristors which rectify the three phase AC output of the AC generator (1); (201) designates a (+) output terminal of the rectifier; (202) designate a (−) output terminal of the rectifier; (3) designates a second full wave rectifier having thyristors which is connected in parallel to the first full wave rectifier (2) and the AC output of the AC generator (1); (301) designates a (−) output terminal of the rectifier; (302) designates a (+) output terminal of the rectifier. The (+) output terminal (201) of the first rectifier (2) is connected to the (−) output terminal (301) of the second rectifier (3) so as to form one terminal (a) for the AC output. The (−) output terminal (202) of the first rectifier (2) is connected to the (+) output terminal (302) of the second rectifier (3) so as to form the other terminal (b) for the AC output.

An alternative current load (5) is connected through a switch for AC device between the AC output terminals (a) and (b). The reference numeral (6) designates a voltage control device which controls the AC output voltage to a desired value by controlling the field current passing through the field coil (102) of the AC generator by detecting the voltage applied between the AC output terminals (a) and (b); (7) designates a battery equipped in a car; (8) designates an oscillator for oscillating a desired frequency (such as 50 or 60 Hz) by feeding from the battery; (9) designates a gate control device which alternately outputs the gate output (901) for the first full wave rectifier (2) and the gate output (902) for the second full wave rectifier depending upon the output waveform of the oscillator (8). The output terminals (not shown) of the gate output (901) are respectively connected to the gates of the thryistors of the first rectifier (2). The output terminals (not shown) of the gate output (902) are respectively connected to the gates of the thyristors of the second rectifier (3); and (10) designates a generation intermittent switch.

The operation of the circuit having the above-mentioned structure will be illustrated.

The engine (not shown) is started in order to rotate the AC generator (1). In the state, this generation intermittent switch (10) is closed whereby the field current is passed from the battery (7) through the switch (10) and the voltage control device (6) to the field coil (102) of the AC generator (1) so as to form the field magnetomotive force and the AC output is generated in the armature winding (101). The AC voltage is simultaneously applied to the first and second rectifiers (2), (3) by the AC output. At this moment, the voltage of the battery (7) is simultaneously applied to the oscillator (8) and the gate control device (9) whereby the oscillator (8) oscillates at a desired frequency (such as 50 to 60 Hz) and the gate turn-on output is alternately generated by the oscillation output to the output terminals (901), (902) of the gate control device (9) at the frequency corresponding to the oscillation frequency of the oscillator (8).

Accordingly, when the gate turn-on signal is output from the gate output terminal (901), the signal is input to the gate circuits of the thyristors of the first rectifier (2) to turn on the thyristors and the three phase alternating current generated in the armature winding (101) of the AC generator (1) is rectified by the first rectifier (2) to provide (+) at the AC output terminal (a) and (−) at the AC output terminal (b). At that time, no signal is fed to the gate output terminals (902) whereby the second rectifier (3) is not turned on.

When the gate output of the gate output terminal (901) is lost and the gate output is fed from the gate output terminal (902), the first rectifier (2) is not turned on but the second rectifier (3) is turned on to provide (−) at the AC output terminal (a) and (+) at the AC output terminal (b).

Thus, the rectifiers (2), (3) can be sequentially switched by switching the signal for the gate circuits of the thyristors in the rectifiers (2), (3) to the gate output terminals (901), (902) depending upon the oscillation frequency of the oscillator (8). Thus, (+) and (−) are alternately applied to the AC output terminals (a), (b) at the oscillation frequency of the oscillator (8) whereby a single phase alternating current is given.

The signal phase alternating current is not substantially varied by the large variation of the revolution velocity of the engine, but is affected only by the oscillation frequency of the oscillator (8).

In accordance with the present invention, the alternating current power source apparatus comprises the first and second rectifiers which are connected in parallel so as to provide each reverse output polarity to the AC output of the AC generator for generating a desired voltage; the oscillator for oscillating at a desired frequency and the gate signal generating circuit which is controlled by the output of the oscillator to feed alternately the turn-on signal to the gate circuits of the first rectifier and the gate circuits of the second rectifier. Accordingly, in comparison with the conventional chopper system, the circuit is simple and no transformer is required so as to improve the efficiency and the apparatus can be compact and light weight and low in cost and has a high reliability. The similar effects can be attained by using half wave rectifiers instead of the full wave rectifiers (2), (3) discussed above.

I claim:

1. An alternating current power source apparatus which comprises an AC generator outputting a three-phase signal having a field coil which is driven by an engine;

a battery for supplying a field current to the field coil of said AC generator;

a first rectifier having three gated thyristors, each one of which is associated with one of said three phases of said generator output, which rectify the AC output of said AC generator;

a second rectifier having three gated thyristors, each one of which is associated with one of said phases of said generator output, which is connected in parallel to said first rectifier and said AC output of said generator and is connected to give an output having a polarity reverse to the polarity of the output of said first rectifier;

a load driven by single phase AC power connected to said first and second rectifier;

a voltage control device responsive to said outputs of said first and second rectifiers for controlling the output voltage of said generator to a predetermined value by controlling a field current passing from said battery through said field coil;

an oscillator for oscillating at a desired frequency; and a gate signal generating circuit which is controlled by said oscillator so as to feed a turn-on signal alternately to the gate of the thyristors of said first rectifier and the gate of the thyristors of said second rectifier.

2. An apparatus according to claim 1 wherein said first and second rectifiers are respectively full wave rectifiers.

3. An apparatus according to claim 1 further comprising a battery connected in parallel to said oscillator through a switch.

* * * * *